Jan. 10, 1950 — A. H. BAHNSON, JR — 2,493,849
AIR CLEANER
Filed May 15, 1945 — 2 Sheets-Sheet 1

Inventor:
Agnew H. Bahnson Jr.
by Pierce, Scheffler & Parker
Attorneys.

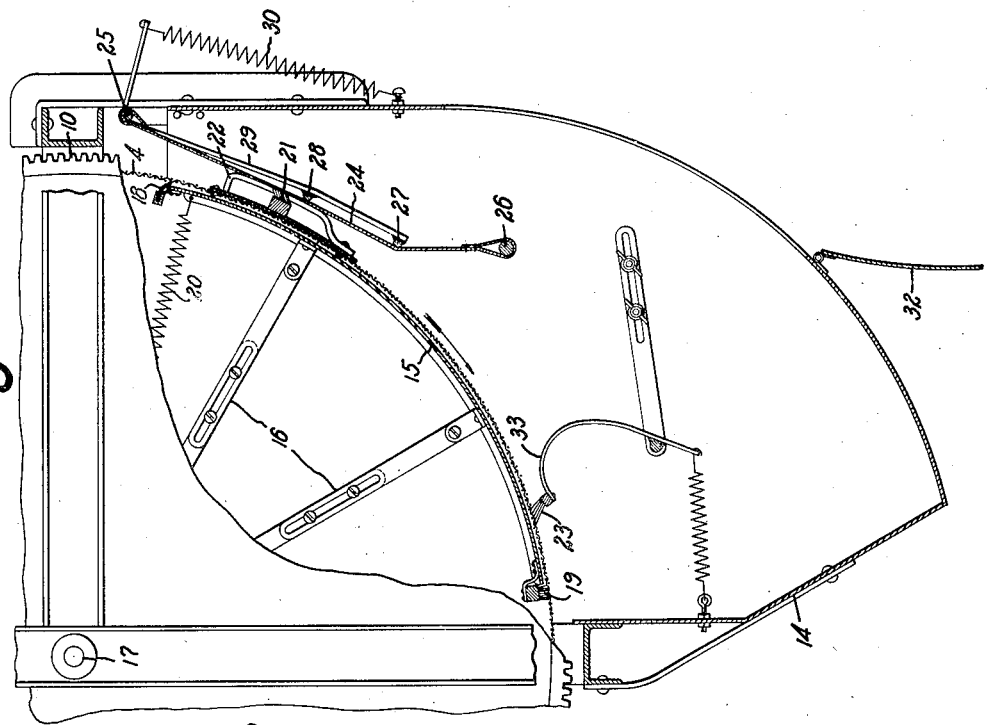
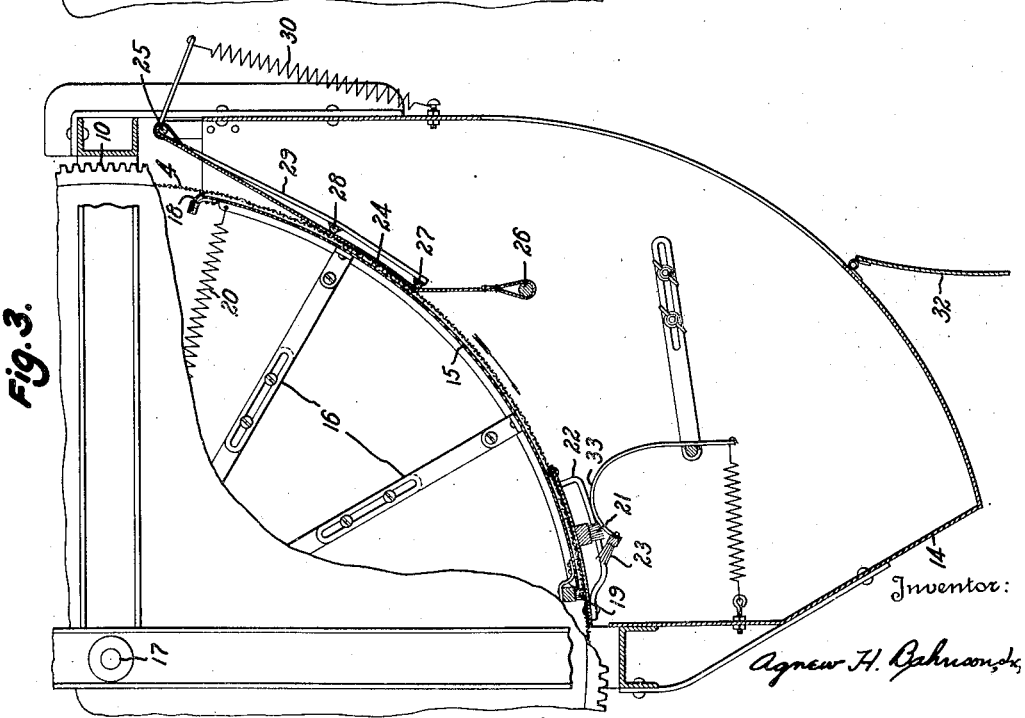

Patented Jan. 10, 1950

2,493,849

UNITED STATES PATENT OFFICE 2,493,849

AIR CLEANER

Agnew H. Bahnson, Jr., Winston-Salem, N. C.

Application May 15, 1945, Serial No. 593,788

11 Claims. (Cl. 183—60)

In the operation of ventilating and air conditioning systems it is frequently desirable and sometimes practically necessary to filter the air to remove suspended dust, lint, insects and other suspended solid impurities from it. This is particularly true in factory or work shop systems such as textile mills in which the atmosphere tends to become contaminated with large amounts of lint etc.

Removal of this material from the atmosphere in the mill not only renders the atmosphere more healthful for the workers but improves the operation of machines by preventing or retarding the formation of deposits of dust on working parts of the machines.

In ventilating and air conditioning work rooms it is customary to bring in fresh air from the outer atmosphere and to recirculate air within the room. The former may not require filtering but the latter generally does.

The present invention relates to apparatus for filtering the air in such a ventilating system and is particularly adapted for use with the ventilating system of a textile mill in which the suspended solid impurity in the air consists principally of lint.

The outstanding problems presented in the provision of means for cleaning the air of a ventilating system for a textile mill is to provide a filter that will continuously and efficiently remove the suspended solids from the air and will handle a large volume of air without unduly burdening the air circulating means.

The accompanying drawings illustrate an embodiment of my invention.

Referring to the drawings:

Fig. 3 is a fragmentary vertical end elevation of the filter in one operative position and;

Fig. 4 is a fragmentary vertical end elevation of the filter in another operative position.

Figure 1:
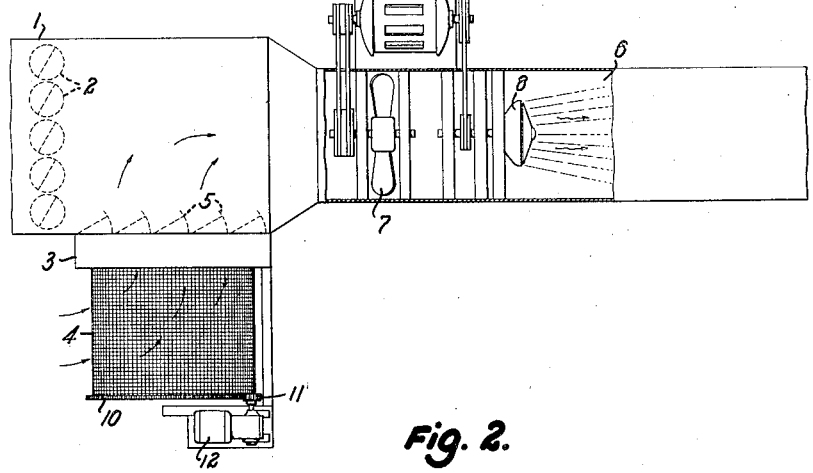
Fig. 1 is a fragmentary horizontal sectional plan view of the air filter associated with a duct for supplying fresh and recirculated air to a room.
Figure 2:
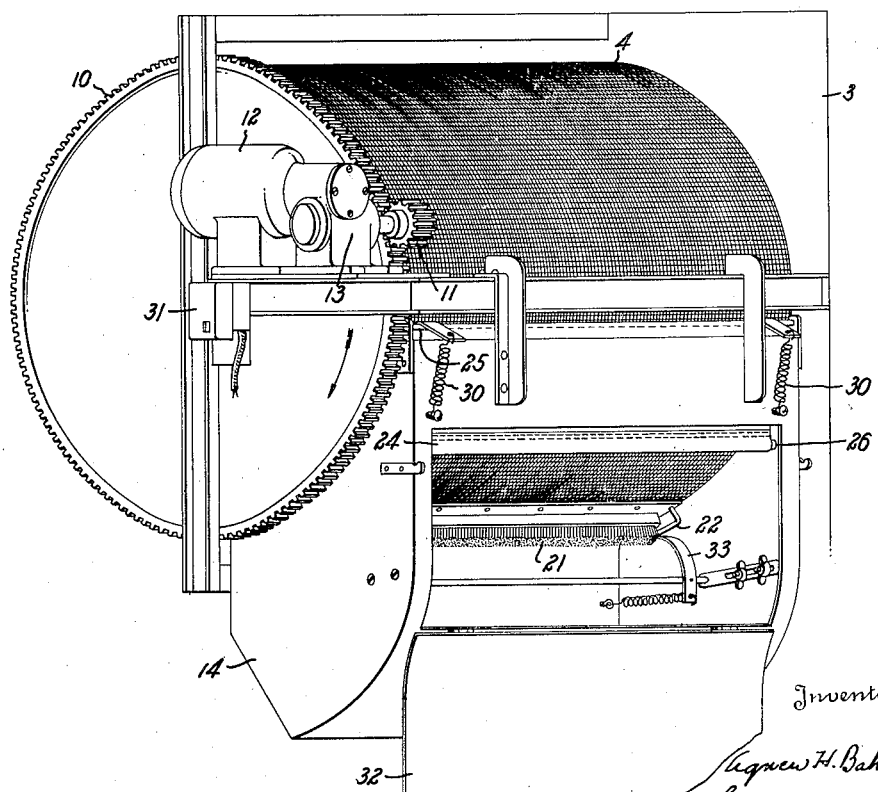
Fig. 2 is a front perspective elevational view of the filter.

In the embodiment illustrated in Fig. 1 the filter is positioned to filter only the recirculated air but it is to be understood that this is merely illustrative and that the filter may be positioned to filter only the fresh air or both the fresh and the recirculated air or that a battery of the filters may be arranged to filter the air at a central station.

In Fig. 1 the ventilating conduit or duct comprises the branch 1 leading to a source of fresh air, said branch being controlled by dampers 2, a branch 3 leading to the filter 4, said branch 3 being controlled by dampers 5, and a branch 6 leading into the space to be ventilated, said branch 6 containing the fan or blower 7 and humidifier 8 both driven by the motor 9.

The filter consists of a cylindrical screen of suitable mesh, preferably as fine as fly screen, i. e. about 15 mesh to the linear inch or finer, smoothly supported upon a cylindrical cage like structure (not shown). The screen support may consist for instance of end rings carried by radical spokes from hubs with longitudinal ribs supported between the two rings and preferably, in order smoothly to support the fine wire screen, circumferential bands or a relatively coarse and rigid screen supported on the rods and serving to carry the relatively flexible fine wire screen. So far as my present invention is concerned the filter is merely a hollow cylindrical fine wire screen open at one end and closed at the other and mounted for rotation on a substantially horizontal axle, such as one skilled in the art might produce following this brief general description.

The open end of the cylindrical screen communicates with the branch 3 of the ventilating conduit and is sealed thereto in any suitable way as to providing a smooth imperforate band around the open end of the cylinder against which bears a flexible sealing member such as a cloth or fabric ring carried by the walls of the branch 3. It will be appreciated that the cylinder rotates while the branch 3 of the ventilating conduit is stationary and means must be provided for preventing too much air from by-passing the screen and entering the branch 3 directly without passing through the screen. Some leakage between the screen and the ventilating conduit is of course not critical.

The closed end of the cylindrical filter is provided with an external ring gear 10 which meshes with the pinion 11 driven by the motor 12 through suitable reducing gears 13.

The doffing box 14 encloses about the lower front quarter of the cylindrical screen and serves to house the mechanism for cleaning the screen and also as a receptacle for the accumulated dust.

Referring to Fig. 3 it will be seen that substantially the lower front quarter of the screen i. e. substantially that portion covered by the box 14 is backed by the stationary imperforate baffle 15 supported parallel to the inside of the screen by the radial arms 16. Arms 16 are supported by the stationary axle 17 upon which the cylinder rotates. Each edge of the baffle 15 is sealed to the inner side of the screen, the upper edge by brush 18 or a rubber flap or other suitable flexible sealing member and the lower edge by brush 19. The upper arms 16 are provided with slip holes so that the baffle 15 is pivoted about its connections to the lower arms 16 and the spring 20 attached to the upper edge of the baffle tends to tilt it and to hold the brush 19 snugly against the inner surface of the screen.

A radial portion of the cylinder, about 60° of the circumference thereof, is imperforate and the leading edge of the imperforate portion of the cylinder carries the brush 21 which projects outwardly from the surface of the cylinder. The purpose and function of the brush 21 is to prevent the accumulation of a wad of dust or lint between the doffing cloth and the cylinder as will be described below. At the ends of the brush 21 and also carried by the cylinder are the cam members 22 the purpose of which is to raise the doffing cloth away from the cylinder while the brush 21 passes. A brush 23 is spring mounted to bear against the outer surface of the cylinder and its supporting structure at each end thereof is provided with the cam surfaces 33 adapted to engage the cam surfaces 22 and thus to raise the brush 23 clear of the surface of the cylinder and to permit the brush 21 to pass. The principal purpose of the brush 23 is to clean the outer surface of the screen. Incidentally it serves to clean the brush 21 and to seal the opening between the screen and the lower edge of the box 14.

The doffing cloth 24 is secured by the upper edge thereof to the stationary rod 25 and extends downwardly over the cylinder surface to the weight 26. The doffing cloth is normally held against the surface of the cylinder by the longitudinal rods 27 and 28 supported by the arms 29 hinged on the rod 25 and normally pressed toward the cylinder by the spring or springs 30.

The operation of the filter is as follows. It is rotated at a suitable rate, depending upon the amount of air being filtered and the amount of dust which it contains, by the motor 12. The filter functions to clean the air most perfectly when it carries a layer of filtered lint, said layer serving more perfectly than the fine mesh screen to filter fine dust particles out of the air. In the movement of a given point of the surface of the cylinder from the point where it is cleaned by the doffing cloth around until said point is again cleaned by the doffing cloth it will of course gradually build up a layer of filtered dust and the rate of rotation must be so adjusted that this filtered layer of dust does not become so thick and impermeable as to place too great a burden on the fan 7 or to cut down the amount of air circulated to such an extent that the air within the ventilated space is not kept clean. If desired the rotation of the cylinder may be made responsive to the rate of flow of air through the branch 3 or to the pressure in the branch 3 by the use of a suitable gas velocity or pressure responsive instrument. The flow or pressure responsive instrument may act either to control an electrical switch to stop and start the motor or to operate speed control mechanism to vary the speed of the motor. Thus when the pressure or flow rate exceeds a certain figure, the cylinder may be stopped or slowed and when the pressure or rate of flow drops the motor may be started or caused to run faster. Such details of the control of the operation of the cylinder are within the skill of a mechanic or electrician and are not illustrated or described in detail. I have illustrated merely the timer 31 to indicate that the operation of the cylinder is to be regulated.

The door 32 of the box 14 is normally closed. As the screen cylinder 4 rotates and dust laden air is drawn through its exposed surface by the fan 7, a filter cake accumulates on the surface and the surface bearing this filter cake passes in contact with the doffing cloth 24. The filter cake is thus rolled off of the screen surface and dropped into the box 14 where it collects. During the action of the doffing cloth on the screen surface the screen is backed by the baffle 15 which prevents the dust loosened from the screen by the doffing cloth from being sucked through the screen and passing with the filtered air through the branch 3 into the ventilating duct.

The dust removed from the screen by the doffing cloth, especially when the filter cake is thick, tends to accumulate in front of the rod 28 and this is removed at each revolution of the cylinder by the brush 21, this action being facilitated by the raising of the rods 28 and 27 by the cams 22. The dust stirred up by this operation also is prevented from passing through the filter into the ventilating air by the baffle 15. If the box were perfectly tight, the baffle 15 would be unnecessary because then there would be no movement of air through the scren wihin h box and within the box but the box is not sealed to the screen sufficiently tightly to prevent some movement of air through the screen within the box and the baffle 15 therefore serves a useful purpose. That portion of the cylinder which is not engaged by the doffing cloth i. e. that portion of the cylinder which passes the doffing cloth while the latter is raised clear of the cylinder by the cams 22 preferably is imperforate. However since very little air passes through that portion of the screen within the box due to the action of the box and the baffle it is not essential to have this section of the cylinder imperforate, this being merely an added refinement.

The dust and lint accumulated in the box 14 is removed from time to time through the door.

The use of a revolving screen for filtering the air of a ventilating or air conditioning system, and the use of a doffing cloth for cleaning the surface of the screen is disclosed in a patent to Agnew H. Bahnson, No. 2,178,463 and in a patent to Jerry H. Simpson, No. 2,169,435. My present invention is concerned with improvements of this previously disclosed apparatus, particularly with respect to the provision of means for the removal of accumulated lint from between the cylinder and the doffing cloth, for preventing dust stirred up or released by the cleaning operation from passing through the screen into the filtered air, and for keeping the screen clean, that is, for preventing lint and dust from packing in the screen openings.

I claim:

1. An air cleaner comprising a hollow cylinder having a filtering cylindrical wall, means for revolving the cylinder, means for passing air to be filtered through the cylindrical wall, a sheet of fabric yieldingly held against the outer surface of the cylinder and a brush carried by the cylinder and extending outwardly from the outer surface thereof and serving to remove the mass of filtered material accumulated by said sheet of fabric.

2. An air filter comprising a hollow cylinder having a filtering cylindrical wall, means for revolving the cylinder, means for passing air to be filtered inwardly through the cylindrical wall, a sheet of fabric yieldingly held against the outer surface of the cylindrical wall, a stationary brush positioned to bear against the outside of the cylinder and yieldingly held against the cylinder, a brush carried by the cylinder and extending outwardly from the outer surface thereof to engage and clean said sheet of fabric and means carried by the cylinder for raising said yieldingly held brush away from the surface of the cylinder to permit the passage thereunder of said brush carried by the cylinder said brushes engaging each other in passing whereby they are cleaned.

3. An air cleaner comprising a hollow cylinder having a filtering cylindrical wall, means for revolving the cylinder, means for passing air to be filtered inwardly through said cylindrical wall, a stationary imperforate baffle supported within the cylinder and adjacent the inner surface thereof, said baffle extending over a segment only of said cylindrical surface and serving to hinder the passage of air through said segment of the cylinder wall, yielding means for sealing the edges of the baffle to the cylindrical wall and a cloth yieldingly held against the outer surface of the cylinder opposite said baffle.

4. An air cleaner comprising a hollow cylinder having a filtering cylindrical wall, means for revolving the cylinder, means for passing air to be filtered inwardly through said cylindrical wall, a stationary imperforate baffle covering a segment of the inner surface of the cylindrical wall, a cloth yieldingly held against the outer surface of the cylindrical wall opposite said baffle and a brush carried by the cylindrical wall and extending outwardly therefrom and serving to remove filtered material from said cloth.

5. An air cleaner comprising a hollow cylinder having a filtering cylindrical wall, means for revolving the cylinder, means for passing air to be filtered inwardly through said cylindrical wall, a stationary imperforate baffle covering a segment of the inner surface of the cylindrical wall, a cloth yieldingly held against the outer surface of the cylindrical wall opposite said baffle, a brush carried by the cylindrical wall and extending outwardly, and means carried by the cylinder for raising said cloth away from the surface of the cylinder to permit the passage thereunder of said brush.

6. An air cleaner comprising a hollow cylinder having a filtering cylindrical wall, means for revolving the cylinder, means for passing air to be filtered inwardly through said cylindrical wall, a stationary brush bearing against the inner surface of the cylinder, a brush yieldingly held against the outer surface of the cylinder, a cloth yieldingly held against the outer surface of the cylinder, a brush carried by the cylinder and extending outwardly from the surface thereof and means carried by the cylinder for raising said cloth and said yieldingly held brush away from the surface of the cylinder to permit said brush carried by the cylinder to pass.

7. An air cleaner comprising a hollow cylinder having a filtering cylindrical wall, means for revolving the cylinder, means for passing air to be filtered inwardly through said cylindrical wall, a brush yieldingly held against the outer surfaces of the cylinder, a cloth yieldingly held against the outer surface of the cylinder, a brush carried by the cylinder and extending outwardly from the surface thereof and means carried by the cylinder for raising said cloth and said yieldingly held brush away from the surface of the cylinder to permit said brush carried by the cylinder to pass.

8. An air cleaner comprising a cylindrical wall having a longitudinally extending imperforate segment, and a longitudinally extending foraminous filtering segment, means supporting said cylindrical wall for rotation on its axis, one end of the space enclosed by said cylindrical wall being closed and the other end being open, means for rotating said cylindrical wall on its axis, means for passing air to be filtered inwardly through the filtering segment of said wall and for withdrawing the resulting filtered air from the space enclosed by said wall through said open end, a stationary baffle covering a segment of the inner surface of said wall and preventing the passage of air therethrough, the edges of said baffle being sealed against the inner surface of said wall by flexible sealing means carried by the edges of the baffle and bearing against the wall, the sealing means along at least one longitudinal edge of the baffle being a brush, a sheet of fabric, means for yieldingly holding said sheet of fabric against the outer surface of said wall at a position opposite said baffle, a brush carried by the imperforate portion of said wall and extending outwardly therefrom, a stationary brush positioned to engage the outer surface of said wall adjacent said baffle, means yieldingly supporting said stationary brush in contact with the outer surface of said wall, cam members carried by said wall and positioned to engage the means yieldingly holding the fabric against the wall to move the same away from the wall and permit the passage thereunder of the brush carried by the wall, said cam means also engaging the means yieldingly supporting the stationary brush against the wall to move said stationary brush away from the wall and permit the brush carried by the wall to pass under it and a box enclosing said fabric and said stationary brush for receiving dust and lint removed thereby from the surface of the wall.

9. An air cleaner comprising a hollow cylinder having a filtering cylindrical wall, means for revolving the cylinder, means for passing air to be filtered inwardly through said cylindrical wall, a stationary imperforate baffle covering a segment of the inner surface of the cylindrical wall, a cloth yieldingly held against the outer surface of the cylindrical wall opposite said baffle, a brush yieldingly held against the outer surface of the cylinder, a brush yieldingly held against the inner surface of the cylinder, and means for raising the cloth and also said brush yieldingly held against the outer surfaces of the cylinder.

10. An air filter comprising a hollow cylinder having a filtering cylindrical wall portion, means for revolving the cylinder, means for passing air to be filtered inwardly through the filtering cylindrical wall portion, stationary cleaning means positioned to bear against the outer surface of the cylinder and yieldingly maintained in contact therewith to remove filtered material from the filtering surface, and a brush carried by said cylinder positioned to engage said stationary cleaning means upon rotation of said cylinder whereby to remove filtered material therefrom.

11. An air filter comprising a hollow cylinder having a filtering cylindrical wall portion, means for revolving the cylinder, means for passing air to be filtered inwardly through the filtering cylindrical wall portion, a stationary brush positioned to bear again the outer surface of the cylinder and yieldingly maintained in contact therewith to remove filtered material from the filtering surface, and a brush carried by said cylinder positioned to engage said stationary brush upon rotation of said cylinder whereby to remove filtered material collected by said stationary brush, the engagement of said brushes with each other in passing, effecting a mutual cleaning thereof.

AGNEW H. BAHNSON, Jr.

REFERENCES CITED

The following references are of record in the file of this patent:

UNITED STATES PATENTS

| Number | Name | Date |
|---|---|---|
| 360,129 | Whitehill | Mar. 29, 1887 |
| 399,713 | Watson | Mar. 19, 1889 |
| 796,434 | Klein | Aug. 8, 1905 |
| 1,444,092 | Anderson | Feb. 6, 1923 |
| 2,169,435 | Simpson | Aug. 15, 1939 |
| 2,178,463 | Bahnson | Oct. 31, 1939 |

FOREIGN PATENTS

| Number | Country | Date |
|---|---|---|
| 740,118 | France | Nov. 12, 1932 |